United States Patent [19]
Boyce

[11] Patent Number: 5,667,903
[45] Date of Patent: Sep. 16, 1997

[54] METHOD OF HARD FACING A SUBSTRATE, AND WELD ROD USED IN HARD FACING A SUBSTRATE

[75] Inventor: James Edward Boyce, Cedar Hill, Tex.

[73] Assignee: Dresser Industries, Inc., Dallas, Tex.

[21] Appl. No.: 438,999

[22] Filed: May 10, 1995

[51] Int. Cl.$^6$ ............................................. B22F 1/00
[52] U.S. Cl. ..................... 428/558; 419/3; 419/8; 419/9; 419/14; 75/302; 75/236
[58] Field of Search .................. 428/558; 419/3, 419/8, 9, 14; 75/302, 236

[56] References Cited

U.S. PATENT DOCUMENTS

| | | | |
|---|---|---|---|
| 1,803,875 | 5/1931 | Stoddy et al. | 175/435 |
| 3,120,285 | 2/1964 | Rowley et al. | 175/408 |
| 3,583,471 | 6/1971 | Kemming | 164/97 |
| 3,800,891 | 4/1974 | White et al. | 175/374 |
| 4,610,320 | 9/1986 | Beakley | 175/409 |
| 4,726,718 | 2/1988 | Meskin et al. | 408/145 |
| 4,836,307 | 6/1989 | Keshavan et al. | 175/374 |
| 4,944,774 | 7/1990 | Keshavan et al. | 175/374 |
| 4,976,915 | 12/1990 | Kuroki | 419/8 |
| 5,004,886 | 4/1991 | Bom et al. | 219/76.14 |
| 5,070,952 | 12/1991 | Neff | 175/426 |
| 5,250,084 | 10/1993 | Lansell et al. | 51/293 |

OTHER PUBLICATIONS

ASTM Standard Test Method G65-91, "Measuring Abrasion Using the Dry Sand/Rubber Wheel Apparatus", pp. 246-254 (1991).

*Primary Examiner*—Charles T. Jordan
*Assistant Examiner*—Anthony R. Chi
*Attorney, Agent, or Firm*—Gregory Garmong

[57] ABSTRACT

A weld rod is prepared by placing a plurality of tungsten carbide/cobalt nuggets, preferably mixed with loose material, into a steel tube. The nuggets are previously sintered and have a generally ellipsoidal shape. A substrate is hard faced by progressively melting the weld rod onto the surface to be hard faced, and allowing the melted material to solidify on the surface.

39 Claims, 4 Drawing Sheets

METHOD OF HARD FACING A SUBSTRATE, AND WELD ROD USED IN HARD FACING A SUBSTRATE

BACKGROUND OF THE INVENTION

This application relates to the hard facing of surfaces and to the weld rod used in such hard facing, and, more particularly, to hard facing rock bits with tungsten carbide/cobalt material.

A rock bit is a specialized drill bit used in the drilling of oil and gas wells. A conventional rock bit has three rotatable, conical cutters with teeth thereon. The conical cutters are mounted in a generally triangular arrangement so as to protrude from the lower end of a housing termed an arm. The rock bit is attached to the lower end of a drill string of hollow tubes, and a lubricant termed "mud" is pumped through the drill string to lubricate the rock bit and/or wash rock cuttings away from the rock bit during the drilling operation.

The rock bit is made of a strong, ductile steel selected to have good strength and toughness. This steel cannot itself serve as the cutting face of the conical cutters, because it would be rapidly worn away by the abrasive contact with the rock being cut. Instead, it has long been the practice to place a hard coating, usually termed a "hard facing", on the teeth and other surfaces of the rock bit, termed the "substrate", that are subjected to the greatest intensity of wear during the cutting operation. The hard facing resists wear, so that the rock bit enjoys the benefits of both the tough steel body and the wear resistant coating.

The hard facing material is usually a mixture of a hard, wear resistant material embedded in a metallic matrix. The metallic matrix is fused with the surface of the steel in the rock bit by welding, to ensure adherence of the coating to the substrate. The wear-resistant material is typically tungsten carbide particles mixed with cobalt. The wear-resistant material is placed into a steel tube, which serves as a weld rod during weld application of the hard facing to the rock bit surface.

The tungsten carbide/cobalt hard facing approach has proved highly successful in extending the service lives of rock bits, and is widely used commercially. However, there is always a need for an improved approach that achieves improved rock bit performance with decreased wear and increased operating life. The present invention fulfills this need, and further provides related advantages.

SUMMARY OF THE INVENTION

The present invention provides a welding material, welding rod, and method for hard facing substrates such as rock drills with the welding material. The approach of the invention results in substantially improved resistance to abrasion of the face of the coated substrate in rock bit applications. It allows the use of a wide range of hard facing material constituents, including conventional hard facing material constituents such as tungsten carbide/cobalt material. Well-established hard facing techniques can also be used.

In accordance with the invention, an article of manufacture comprises a nugget formed of a sintered mixture of hard, nonmetallic particles embedded in a metallic matrix. The nugget has a generally ellipsoidal shape, preferably with a smooth, rounded exterior surface. In practice, a plurality of the sintered nuggets are captured within a hollow steel tube, optionally with additional loose nonmetallic particles and/or loose metallic material, to form a weld rod. The nonmetallic particles incorporated into the nuggets are preferably tungsten carbide. Loose nonmetallic tungsten carbide or other nonmetallic materials selected for abrasion resistance or oxidation resistance can be incorporated into the weld rod. The metallic material of the nuggets is preferably cobalt. The loose metallic material is preferably a metal or intermetallic material, such as an alloy or compound of metallic and possibly other elements, that inhibits oxidation during the welding process.

In a related method, an article such as portions of a rock bit is hard faced by providing the article having a substrate surface that is to be coated with a hard facing, and providing a hard-facing rod of the type previously described. The method further includes progressively melting the hard-facing rod to form weld metal, and applying the weld metal to the substrate surface and solidifying the weld metal in contact to the substrate surface.

The hard-facing weld rod is preferably prepared by first furnishing the sintered nuggets, and then by placing the sintered nuggets into the steel tube with optional additional material. The nuggets are conveniently made by forming an adherent mixture of the hard particles and the metallic material, together with a fugitive organic binder. Portions of the mixture are tumbled to form a generally ellipsoidal shape, during which tumbling any edges or sharp corners are removed so that the final nugget shape has a smoothly rounded contour. The generally ellipsoidally shaped mass is sintered, by direct sintering or sintering with concurrent hot isostatic pressing. The sintered nuggets are packed into the steel tube. Loose nonmetallic particles, loose metallic pieces, and/or a binder are also typically added to the steel tube to form, in combination with the nuggets, a relatively densely packed mass within the tube. The ends of the tube are sealed, and the weld rod is ready for use.

The approach of the invention, providing the majority of the hard nonmetallic material and the metallic material in the form of the sintered, generally ellipsoidal nuggets, results in improved resistance to abrasive material loss in testing of hard-faced surfaces by a technique that is known to give a reliable indication of rock bit drilling performance. No change in the hard-facing welding procedures is required, so that field applicators need not be retrained in order to use the invention. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

In a preferred embodiment, a substrate article such as a steel rock bit is coated with a hard facing of tungsten carbide/cobalt material provided from a weld rod feed. In discussing the invention, the preparation of the weld rod will first be discussed, and thereafter its use in hard facing.

Figure 1:
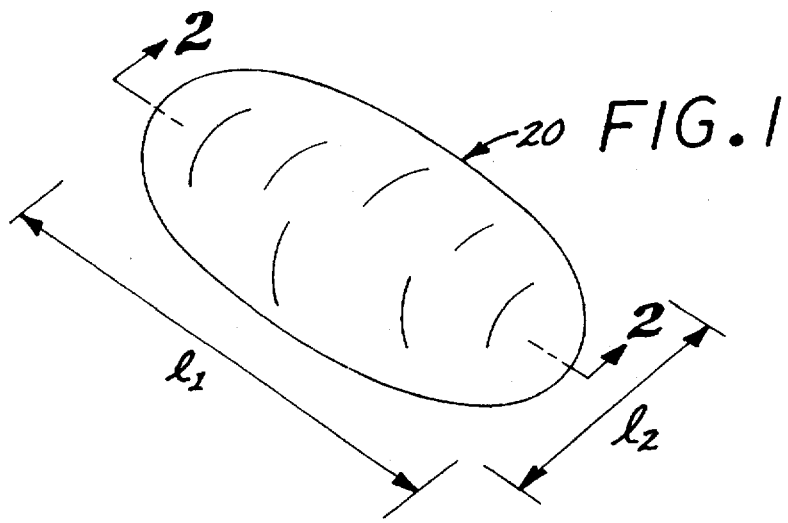
FIG. 1 is a perspective view of a nugget of tungsten carbide and cobalt.
Figure 2:
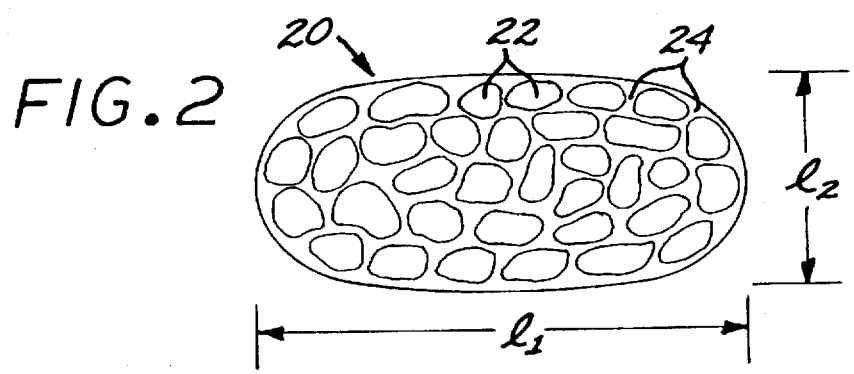
FIG. 2 is a sectional view through the nugget of FIG. 1, taken on lines 2—2.

Referring to FIGS. 1–2, nuggets 20 formed of hard, wear-resistant, nonmetallic particles 22 embedded in a metallic matrix 24 are used. The particles 22 are preferably tungsten carbide and the metallic matrix 24 is preferably cobalt. As used here, the term "cobalt" includes substantially pure cobalt and also alloys of cobalt.

The nuggets 20 are generally ellipsoidal in shape with a rounded, smooth contour as shown in FIGS. 1–2. They are not necessarily all of the same size or shape, and, most preferably, have a range of sizes and shapes to promote dense packing in forming a welding rod, as will be discussed subsequently. The term "generally ellipsoidal" as used herein means that the nuggets 20 have a major axis $l_1$ and a minor axis $l_2$ measuring the largest dimension orthogonal to the major axis, wherein $l_1$ is greater than $l_2$. The term "generally ellipsoidal" indicates that the nuggets 20 have a generously rounded shape that somewhat approximates an ellipsoid. However, its use is not intended to suggest that the nuggets have a shape that is defined by a mathematically exact ellipsoidal body, or that the nuggets have a precisely regular shape. In some instances, the nuggets are somewhat rod-shaped with rounded ends.

Figure 3:
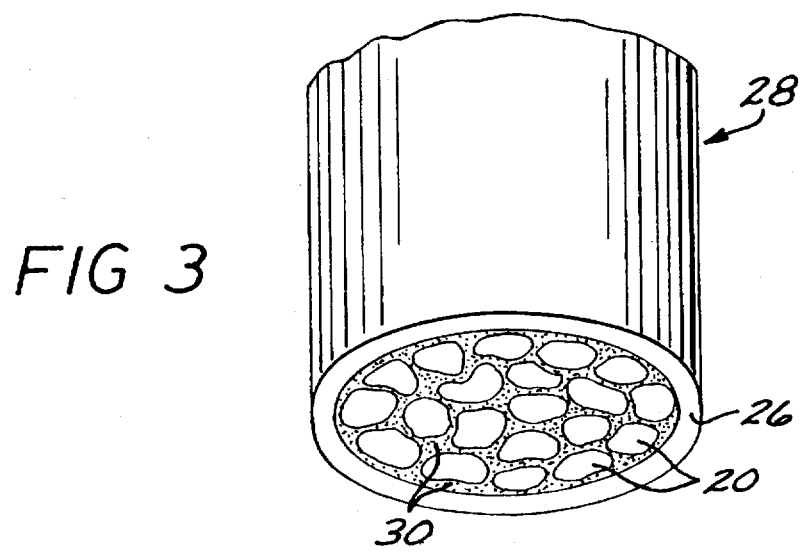
FIG. 3 is a schematic view of a sectioned weld rod prepared by the approach of the invention.

The nuggets 20 preferably have a major axis $l_1$ of from about 0.005 inches to about 0.055 inches in length. The ratio of the major axis $l_1$ to the minor axis $l_2$, sometimes termed the aspect ratio, is preferably from about 1.2:1 to about 3.5:1. If the aspect ratio is less than about 1.2:1, the nuggets are spherical or too nearly spherical, and do not pack well in a steel tube 26, as shown in FIG. 3, when a weld rod 28 is formed. Such spherical or nearly spherical particles tend to unduly limit the amount of tungsten carbide material that can be packed into a selected diameter of weld rod. If the aspect ratio is more than about 3.5:1, the nuggets are too elongated and needle-like, tend to be brittle and break, and do not pack well in the steel tube. It is preferred that the nuggets exhibit a range of aspect ratios and sizes within these limits, to promote dense packing in the steel tube 28. The most preferred range of aspect ratio is from about 1.4:1 to about 2.5:1.

The nuggets 20 preferably comprise from about 4 to about 20 weight percent of the metallic material, most preferably cobalt, with the balance comprising the hard nonmetallic particles, preferably tungsten carbide. These weight percents are expressed as a percentage of the total of metallic material and particles. Most preferably, the nuggets comprise from about 6 to about 14 weight percent of the metallic material, with the balance the nonmetallic particles. The cobalt is desirably a commercially pure material. The tungsten carbide is desirably formed of carburized tungsten having a maximum dimension of from about 0.5 micrometers to about 15 micrometers.

The nuggets 20 have a sintered structure wherein the particles are embedded in a continuous metallic matrix, as shown in FIG. 2. There can be voids present within the sintered structure, but such voids are generally not desirable and are reduced to as low a level as possible by the approach by which the nuggets are manufactured. In the sintered structure, the particles 22 of the hard nonmetallic material are most preferably relatively smooth in their external surface and features. However, smooth particles 22 are difficult to produce, and particles which have a more sharp, angular morphology can be used.

The preferred form of the weld rod 28 of the invention is shown in FIG. 3. The weld rod 28 is prepared by packing a plurality of the nuggets 20 into the tube 26, which is preferably made of steel. The tube 26 can be of any shape, size, and wall thickness, but is typically cylindrical with an inner diameter of from about 0.090 inches to about 0.210 inches, and an outer diameter of from about 0.120 inches to about 0.250 inches. When the nuggets 20 are made by the tumbling process, they assume a range of sizes. The sintered nuggets can be graded by size using the same sieving and classifying techniques used for powders. It is preferred to use nuggets of different sizes when the tube 26 is filled with the nuggets, as this approach results in a higher density of packing within the tube than if a single size of nugget is used. The higher density of packing in the welding rod leads to improved weldability, with less outgassing during welding than encountered with a lower density welding rod. In a preferred approach, the tube is packed with from about 20 to about 80 percent by weight of −16/+30 mesh nuggets, with the balance −40/+80 mesh nuggets.

When the nuggets 20 are packed into the tube 26, some open spaces, termed "interstices" 30, remain between the nuggets 20, even when different sizes and shapes of nuggets are used. Optionally, loose metallic material or loose particles can be packed into the interstices 30 between the nuggets 20, to increase the packing density within the welding rod even further. As used herein, "loose" metallic material or particles indicates metallic (including intermetallic) material or particles, respectively, that are not sintered into the nuggets 20, but are provided in an unsintered form. "Loose metallic material" includes both metals and intermetallic materials. These loose pieces of metallic material or particles fill the space remaining between the nuggets 20, to achieve a higher density of packing in the interior of the tube 26 than could be otherwise attained.

The loose metallic material can include metallics or intermetallics selected to act as deoxidizers during the subsequent welding process. For example, silicomanganese, ferro-manganese, or ferro-silicon pieces are preferably added, in an amount of about 4 percent by weight of the total weight of the weld rod 28.

A binder can also be filled into the interstices 30. The binder is preferably a resin or borophosphate material that serves to bind the deoxidizer to the nuggets. A preferred binder is phenolic resin in an amount of about 0.5 to about 1.0 percent by weight of the total weight of the weld rod 28.

For some applications, it may be desired to replace some of the nuggets 20 with pieces of nonmetallic or intermetallic material to improve weldability, improve the toughness of the final weldment, or improve the wear resistance. For example, some of the nuggets could be replaced with cast tungsten carbide ($WC-W_2C$) or monocrystalline tungsten carbide (WC).

Figure 4:
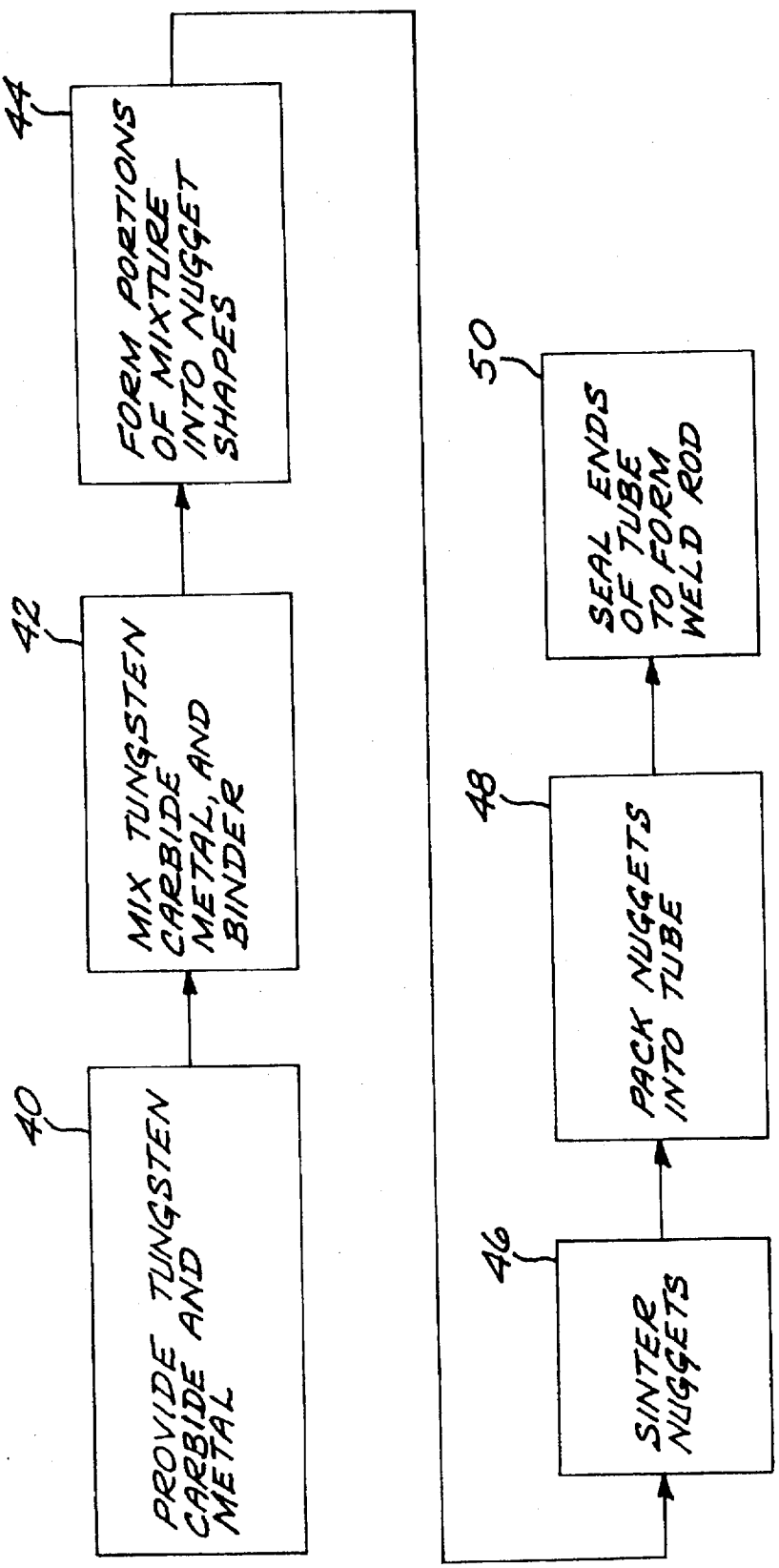
FIG. 4 is a block diagram for the preparation of the weld rod of FIG. 2.

FIG. 4 depicts a preferred method of preparing the nuggets 20 and the weld rod 28. The tungsten carbide particles 22 and pieces of metallic cobalt that become the matrix 24 are provided, numeral 40. The desired amounts of these constituents, selected to yield the fractions discussed previously in the final nuggets, are mixed together. A binder such as about 1.0 to about 2.5 percent by weight of wax is mixed together with the constituents. Portions of the mixture selected to yield nuggets of about the desired size are shaped into the form of the nuggets 20, numeral 44. Shaping is preferably accomplished by tumbling or milling. The shaping time is selected to yield unsintered nuggets within the desired aspect ratio range but of a size slightly larger than the final sintered nuggets to account for shrinkage during sintering. There is normally a range of aspect ratios and sizes in nuggets produced in this manner, which is preferred.

The nuggets are sintered, numeral 46, preferably by liquid phase sintering. In liquid phase sintering, the nugget shapes are heated to a temperature at which the metallic matrix material melts around the particles, typically dissolving some of the particle material into the molten matrix material. The nugget shapes can be sintered at atmospheric pressure, or under a hydrostatic external pressure to reduce the fraction of voids present in the final sintered nugget. This completes the preparation of the nuggets.

To form the weld rod 28, the sintered nuggets 20 are packed into the tube 26, numeral 48, optionally with the continuous addition of loose metallic material and/or loose particles into the interstices 30 between the nuggets 20. The tube 26 can be continuously agitated to improve the packing of the nuggets 20 and the loose material in the interstices 30 so that the packing density within the tube is increased to as high a level as possible. The ends of the tube 26 are sealed, numeral 50, as by melting or crimping together the ends, so that the contents is retained within the tube.

Figure 5:
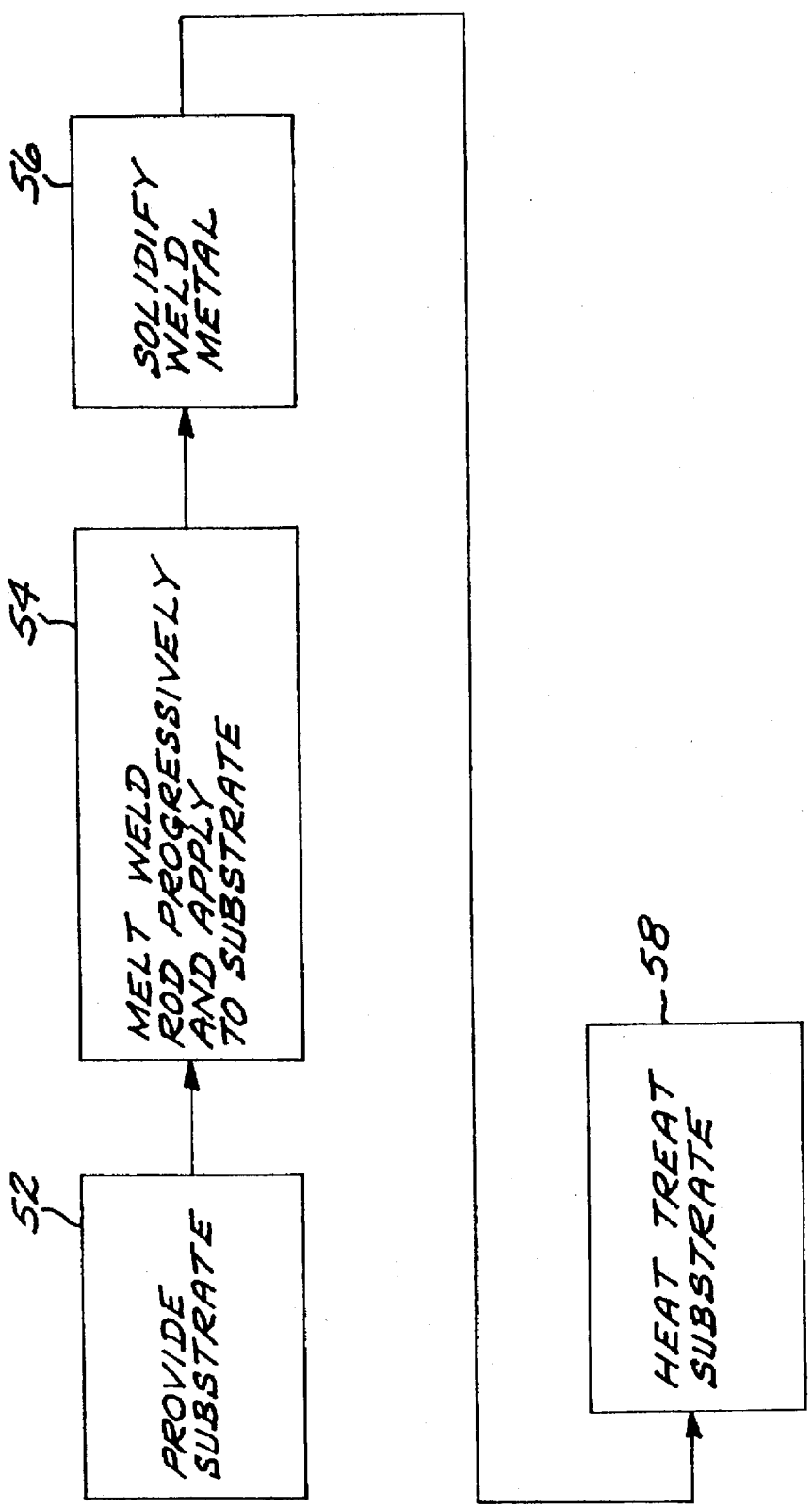
FIG. 5 is a block diagram of a method for hard facing an article using the approach of the invention.
Figure 6:
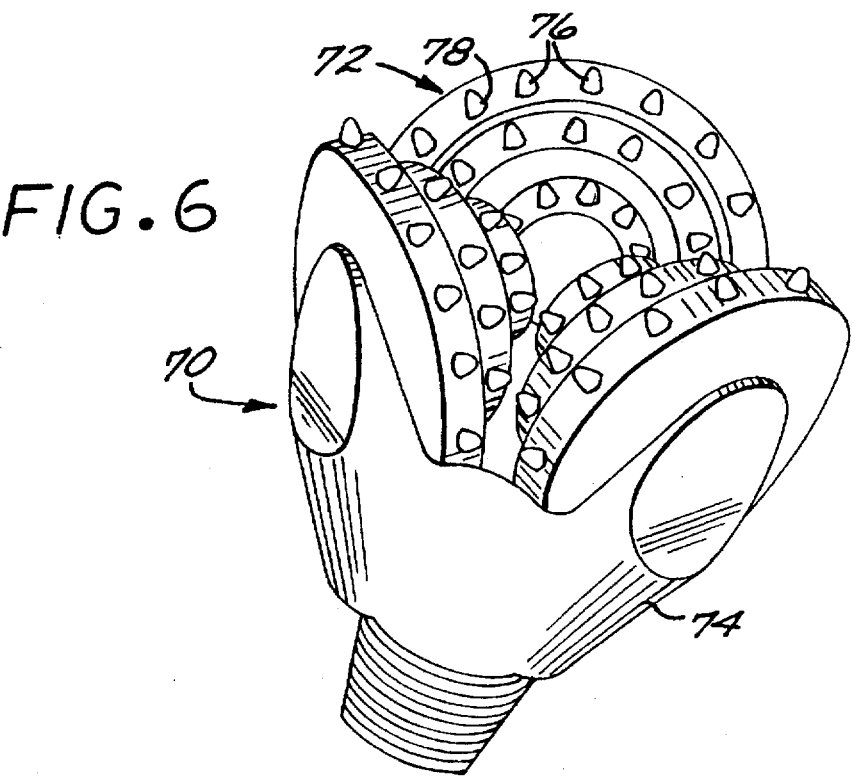
FIG. 6 is a perspective view of a rock bit.

FIG. 5 depicts a method of applying a hard surface coating onto a surface of an article, termed "hard facing" the article. A substrate whose surface is to be hard faced is provided, numeral 52. FIG. 6 illustrates a preferred article, a rock bit 70. The rock bit 70 includes three conical cutters 72 mounted to an arm 74. The conical cutters 72 have teeth 76 extending from the periphery thereof. The teeth 76 and, optionally, other portions of the conical cutters 72 constitute a substrate 78 that is to be hard faced by the approach of the invention.

Figure 7:
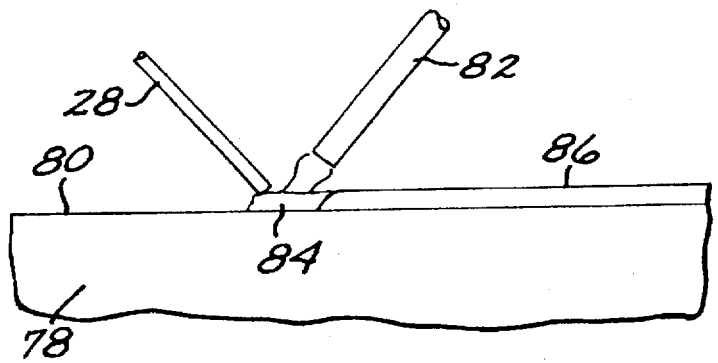
FIG. 7 is a schematic elevational view of the application of the hard facing to the substrate.

The weld rod 28 is progressively melted and the weld metal so formed is applied to the surface of the substrate, numeral 54. As shown schematically in FIG. 7, one end of the weld rod 28 is held adjacent to a surface 80 of the substrate 78. The surface 80 is locally heated by a heat source 82 such as an oxyacetylene or atomic hydrogen torch to a temperature sufficient to melt the steel tube and the metallic material within the weld rod 28, forming a pool 84 of weld metal. The weld rod 28 and heat source 82 are moved in unison over the surface 80, so that the pool 84 solidifies to form a hard-facing layer 86 at locations where the pool 84 is no longer heated and solidifies, numeral 56. More of the weld rod 28 is fed to the heated zone as it is moved laterally along the surface of the substrate, continuously replenishing the pool at a new location. The thickness of the hard-facing layer can be controlled by the diameter of the weld rod, the rate of application, and the size of the weld pool, but it is typically from about 0.030 inches to about 0.250 inches thick.

Figure 8:
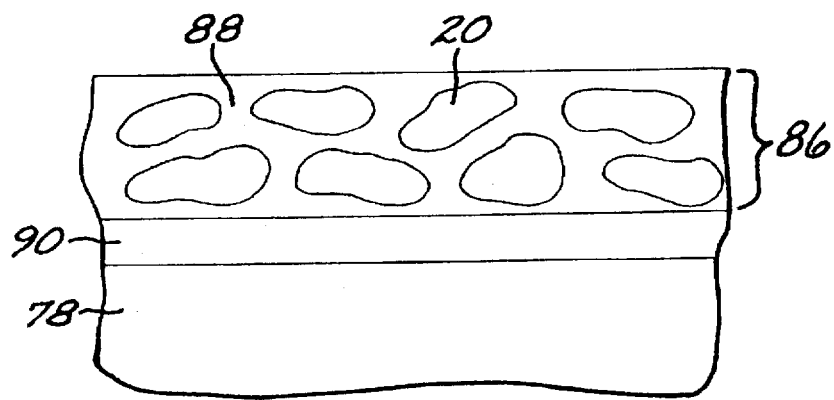
FIG. 8 is a schematic sectional view at a hard-faced surface.

FIG. 8 shows the microstructure of the hard-facing layer 86 and its relation to the substrate 78. The weld deposit 86 comprises the nuggets 20 supplied in the weld rod 28. The nuggets 20 are embedded in a metallic layer 88 which is desirably primarily steel and the loose material added to the interstices 30 during preparation of the weld rod. The metallic layer 88 can also include small amounts of tungsten carbide or cobalt dissolved out of the nuggets. The amount of dissolved material depends upon the welding technique and the characteristics of the nuggets themselves. The steel component of the metallic layer 88 is supplied from the melted tube 26 and by some dissolution of steel from the substrate 78. There is a modified region 90 between the hard-facing layer 86 and the substrate 78 that includes some interdiffused metal formed by the interdiffusion of the metallic layer 88 and the substrate 78 and also a heat-affected zone wherein the microstructure of the substrate 78 is locally altered by the hard-facing welding technique.

The interdiffusion of the modified region 90 is desirable, because it aids in bonding the hard-facing layer 86 to the substrate 78, but the heat-affected zone of altered microstructure may be undesirable because it may render the substrate more susceptible to fatigue and other mechanisms of premature failure. The interdiffusion can be increased and the heat-affected zone removed by an optional heat treatment, numeral 58. In such a heat treatment for the preferred case, the substrate is heated to a temperature of above the austenitizing temperature of the substrate for a minimum of four hours and thereafter cooled to ambient temperature.

In a most preferred approach, sintered nuggets having a composition of about 92–93 percent by weight tungsten carbide, with the balance cobalt are packed inside a steel tube having an inner diameter of from about 0.090 inch to about 0.130 inch, and an outer diameter of from about 0.120 inch to about 0.160 inch to form the weld rod. About 4 weight percent of the total weight of the weld rod of a deoxidizer material such as silico-manganese is packed into the interstices between the nuggets, to aid in weldability of the weld rod material. The weld rod is progressively melted with an oxyacetylene torch to apply a hard-facing layer about 0.080±0.015 inch thick on the surface of the substrate. The substrate and hard-facing layer are thereafter optionally heat treated by the austenitizing treatment discussed above.

Comparative testing has been conducted between the present hard-facing approach and several industry-standard hard-facing techniques. In the standard approaches, the weld rod includes one of several known forms of tungsten carbide particles in a steel tube. Such forms include crushed tungsten carbide particles that are irregular in shape and spherical ball-type pellets of sintered tungsten carbide and irregular monocrystals of tungsten carbide. The composition of the forms can vary from WC–Co to WC–$W_2C$ to WC. Hard-facing layers were applied to steel substrates by the same welder using a conventional oxyacetylene application procedure to minimize any variation due to the application procedure. The hard-facing layer obtained with the present approach was more dense, with less porosity, than the hard-facing layer obtained using the industry-standard weld rods. The hard-facing layers of the two approaches were tested for resistance to abrasion using the ASTM G65 Dry Sand Abrasion Test, which has been previously established as a reliable approach for predicting the service performance of rock bit components. In this test, a rubber wheel rotates against the test specimen, with a controlled force applied between the wheel and the specimen. Dry sand is introduced between the wheel and the specimen. The specimen is weighed before and after a period of abrasion, and the weight loss is converted to an average adjusted volume loss (AVL). The lower the AVL, the better the performance of the specimen. In the present case, the hard-faced layer was abraded by using the ASTM G65 test. For specimens hard faced with the known hard-facing rod using mixed types of tungsten carbide (crushed sintered, cast, monocrystal), the AVL was in the range of 11.7 to 18.34. For specimens hard faced with another known hard-facing rod using crushed sintered tungsten carbide only, the AVL was 13.75. Specimens hard faced using the preferred approach of the invention exhibited an AVL of 9.22. Thus, the approach of the invention yields a 10 to 40% improvement in the performance of the hard-faced substrate in the dry sand abrasion test.

The reasons for the improved results obtained with the present approach are not known with certainty, and the observed improvement is not dependent upon the correctness of any explanation of the improvement. It is believed that a number of factors contribute to the improvements, and these factors will be addressed briefly in relation to the preferred embodiment although they are thought to apply to other embodiments as well. The relative ratio of tungsten carbide particles and cobalt matrix can be varied within the preferred range. When the cobalt content is relatively low, as about 6 percent by weight of the nugget, the hard-facing layer is more wear resistant than when the cobalt content is relatively high, as about 14 percent by weight of the nugget. On the other hand, when the cobalt content is relatively low, the hard-facing layer is less tough than when the cobalt content is relatively high. The relative amounts of tungsten carbide and cobalt can be varied to produce particular combinations of properties required for specific applications.

The smoothly curved, generally ellipsoidal nuggets pack well. The shapes of the nuggets lead to a high packing density within the weld rod. The high relative density of the weld rod in turn contributes to better weldability and a more dense hard-facing layer. The ability to control the sizes of the nuggets and to use a range of nugget sizes in the weld rod also is a contributing factor to the improved properties. Lastly, the porosity sinter condition of the nugget controls the structure of the particle after being weld deposited, to prevent excessive melting.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article of manufacture, comprising a nugget formed of a sintered mixture of hard, nonmetallic particles embedded in a metallic matrix, the nugget having a generally ellipsoidal shape wherein the nugget has a major axis and a minor axis, and wherein the ratio of the length of the major axis to the length of the minor axis is from about 1.2:1 to about 3.5:1.

2. The article of claim 1, wherein the nugget has a major axis having a length of from about 0.005 inches to about 0.055 inches.

3. The article of claim 1, wherein the nugget has a smooth, rounded exterior surface.

4. The article of claim 1, wherein the article comprises a plurality of nuggets.

5. The article of claim 4, wherein each nugget has substantially the same size, shape, and composition.

6. The article of claim 4, wherein the nuggets include at least two sizes and shapes.

7. The article of claim 4, wherein the nuggets include at least two compositions.

8. The article of claim 4, wherein the article further comprises a steel tube surrounding the plurality of nuggets.

9. The article of claim 8, wherein the article further comprises additional hard, nonmetallic loose particles mixed with the plurality of nuggets.

10. The article of claim 8, wherein the article further comprises additional metallic material mixed with the plurality of nuggets.

11. The article of claim 1, wherein the nonmetallic particles are tungsten carbide.

12. The article of claim 1, wherein the metallic matrix is cobalt.

13. The article of claim 1, wherein the nugget comprises from about 4 to about 20 weight percent cobalt, balance tungsten carbide.

14. An article of manufacture, comprising: a steel tube closed at the ends; and a plurality of generally ellipsoidal nuggets within the steel tube, each nugget being formed of a sintered mixture of hard, nonmetallic particles embedded in a metallic matrix.

15. The article of manufacture of claim 14, wherein the nuggets each have a major axis and a minor axis, and wherein the ratio of the length of the major axis to the length of the minor axis is from about 1.2:1 to about 3.5:1.

16. The article of manufacture of claim 14, wherein the nuggets each have a length of from about 0.005 inches to about 0.055 inches.

17. The article of manufacture of claim 14, wherein the nuggets each have a smooth, rounded exterior surface.

18. The article of manufacture of claim 14, wherein the nuggets each have substantially the same size, shape, and composition.

19. The article of manufacture of claim 14, wherein the plurality of nuggets include at least two sizes and shapes.

20. The article of manufacture of claim 14, wherein the plurality of nuggets include at least two compositions.

21. The article of manufacture of claim 14, wherein the article further comprises additional hard, nonmetallic loose particles mixed with the plurality of nuggets.

22. The article of manufacture of claim 14, wherein the article further comprises additional metallic material mixed with the plurality of nuggets.

23. The article of manufacture of claim 14, wherein the particles comprise tungsten carbide.

24. The article of manufacture of claim 14, wherein the metallic matrix is cobalt.

25. The article of manufacture of claim 14, wherein the nugget comprises from about 4 to about 20 weight percent cobalt, balance tungsten carbide.

26. A method of hard facing an article, comprising the steps of: providing an article having a substrate surface that is to be coated with a hard facing;

providing a hard-facing rod, the hard facing rod comprising a plurality of generally ellipsoidal nuggets in a steel tube, each of the nuggets comprising a sintered mixture of hard, nonmetallic particles embedded in a metallic matrix;

progressively melting the hard-facing rod to form weld metal; and applying the weld metal to the substrate surface and solidifying the weld metal in contact to the substrate surface.

27. The method of claim 26, wherein the step of providing an article includes the step of providing a rock bit.

28. The method of claim 26, wherein the step of providing includes the steps of preparing a mixture of tungsten carbide particles and cobalt;

forming the mixture into an ellipsoidal-shaped mass; and sintering the ellipsoidal-shaped mass to form a nugget.

29. The method of claim 28, wherein the step of providing includes the additional steps of mixing the sintered nugget with loose metallic material; and placing the mixture of sintered nugget and loose metallic material into a steel tube.

30. The method of claim 26, wherein the step of providing includes the step of providing nuggets each having a major axis and a minor axis, and wherein the ratio of the length of the major axis to the length of the minor axis is from about 1.2:1 to about 3.5:1.

31. The method of claim 26, wherein the step of providing includes the step of providing nuggets each having a length of from about 0.005 inches to about 0.055 inches.

32. The method of claim 26, wherein the step of providing includes the step of providing nuggets each having a smooth, rounded exterior surface.

33. The method of claim 26, wherein the step of providing includes the step of providing nuggets each having substantially the same size, shape, and composition.

34. The method of claim 26, wherein the step of providing includes the step of providing, in the plurality of nuggets, nuggets having at least two sizes and shapes.

35. The method of claim 26, wherein the step of providing includes the step of providing, in the plurality of nuggets, nuggets having at least two compositions.

36. The method of claim 26, wherein the step of providing includes the step of providing additional hard, nonmetallic loose particles mixed with the plurality of nuggets, in the weld rod.

37. The method of claim 26, wherein the step of providing includes the step of providing particles comprising tungsten carbide.

38. The method of claim 26, wherein the step of providing includes the step of providing cobalt as the metallic matrix.

39. The method of claim 26, wherein the step of providing includes the step of providing the nugget having from about 4 to about 20 weight percent cobalt, balance tungsten carbide.

* * * * *